G. W. BINGHAM.
MOVING PICTURE MACHINE.
APPLICATION FILED DEC. 22, 1909.
963,741.
Patented July 12, 1910.
4 SHEETS—SHEET 4.
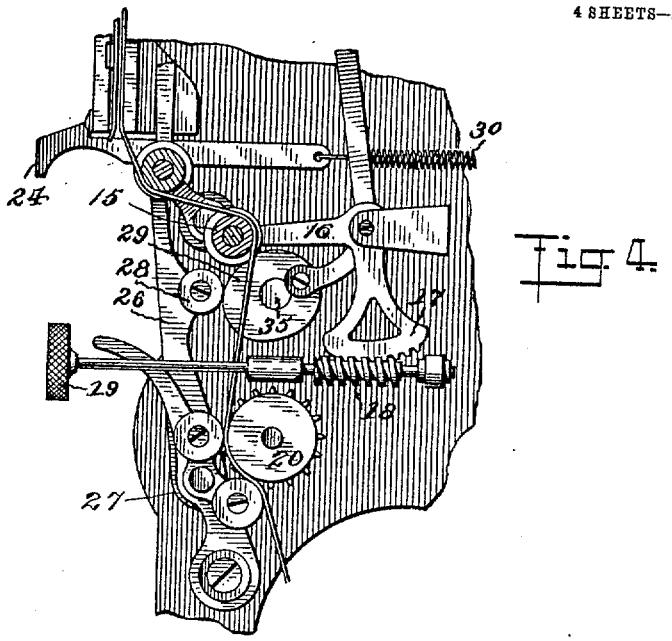
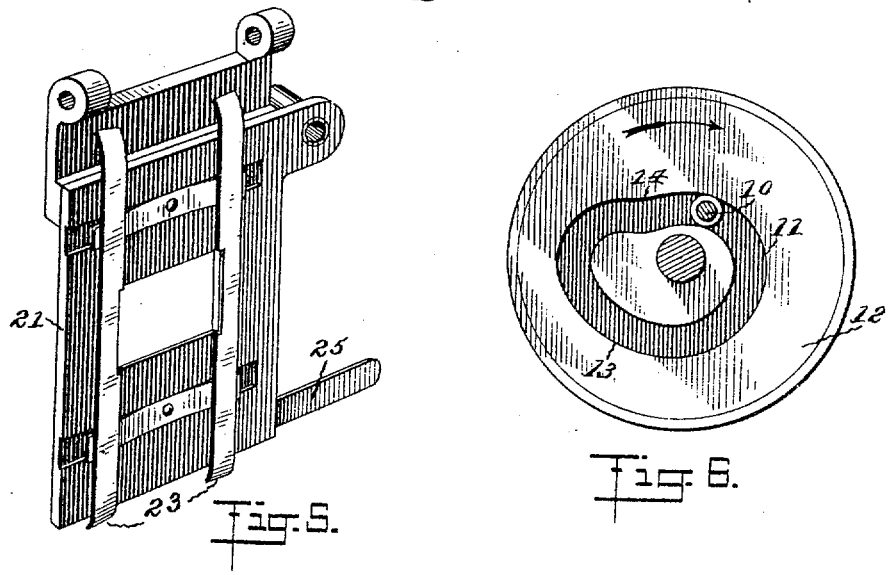
WITNESSES
INVENTOR
George W. Bingham
BY
Brock Beeken & Smith
ATTORNEYS

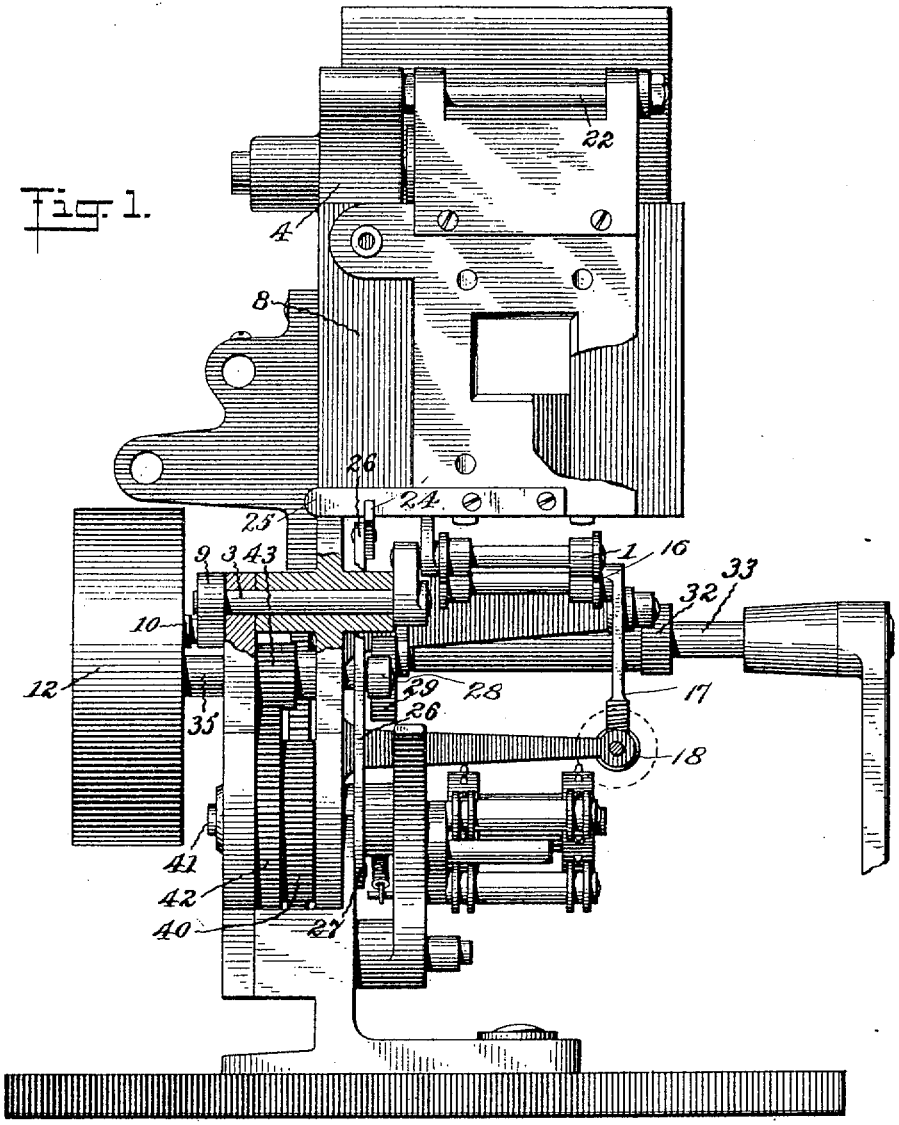

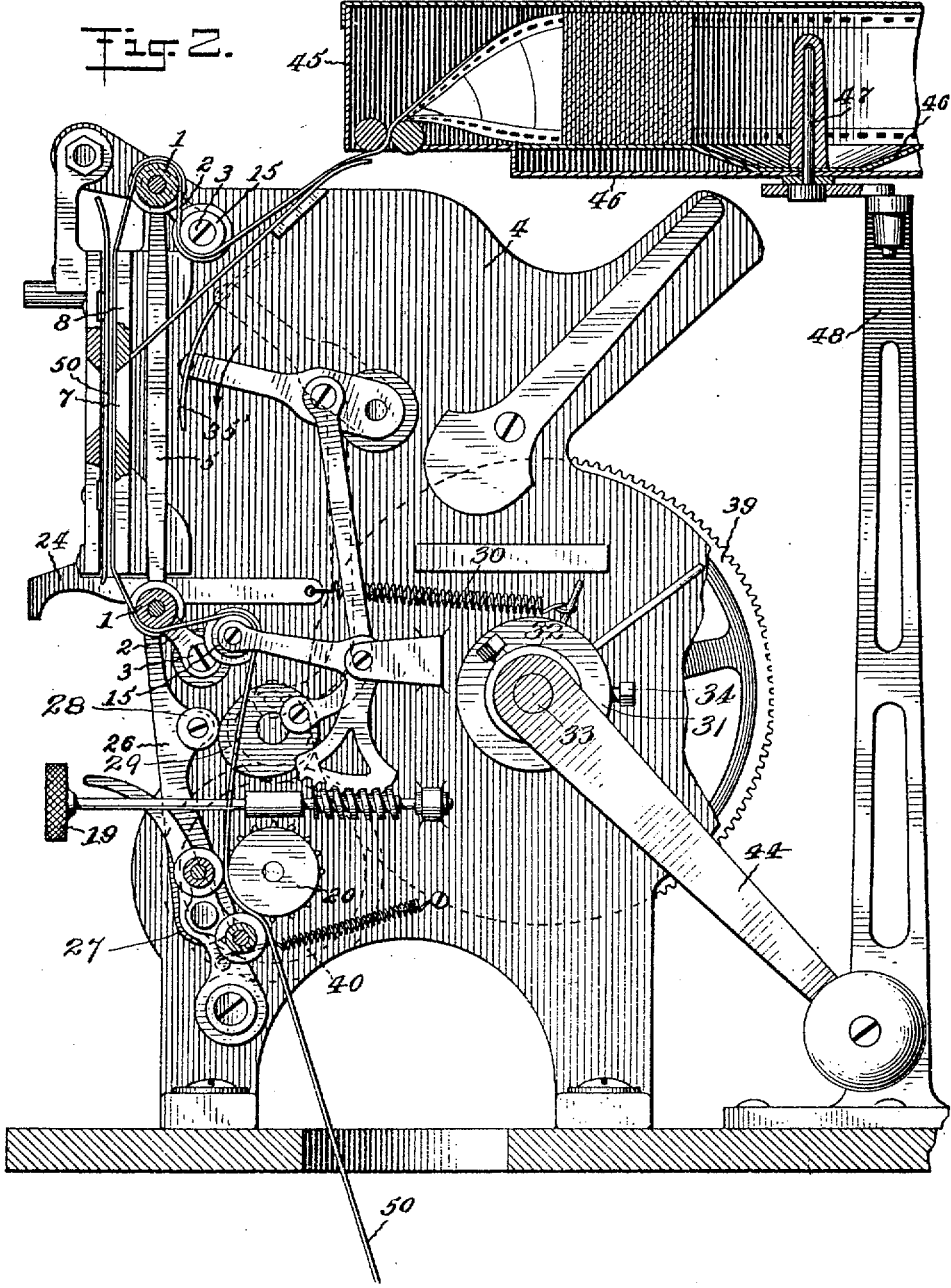

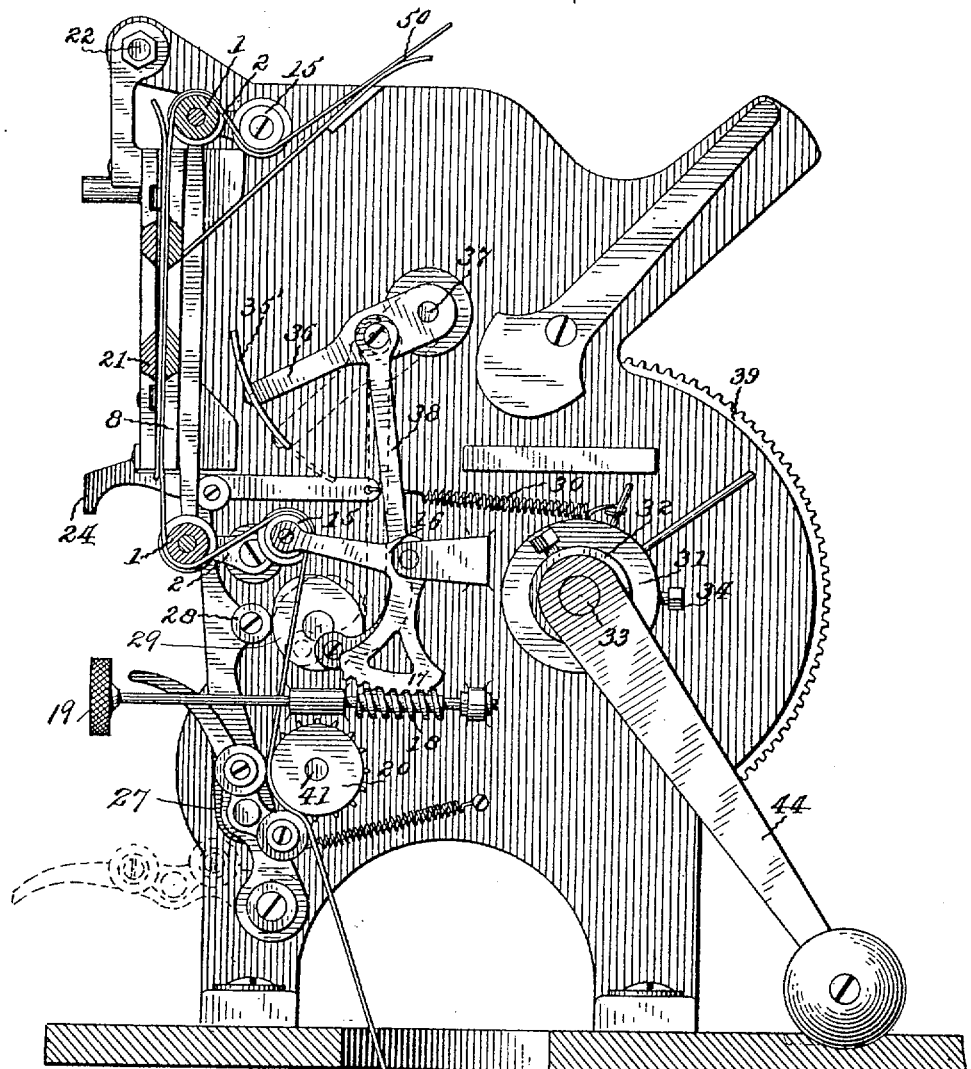

UNITED STATES PATENT OFFICE.

GEORGE W. BINGHAM, OF BROOKLYN, NEW YORK, ASSIGNOR TO THE BINGHAM MANUFACTURING COMPANY, A CORPORATION OF MAINE.

MOVING-PICTURE MACHINE.

963,741.  Specification of Letters Patent.  Patented July 12, 1910.

Application filed December 22, 1909. Serial No. 534,429.

*To all whom it may concern:*

Be it known that I, GEORGE W. BINGHAM, a citizen of the United States, and a resident of borough of Brooklyn, in the county of Kings and State of New York, have invented certain new and useful Improvements in Moving-Picture Machines, of which the following is a specification.

My invention relates to improvements in moving picture machines, and in particular to that class of machines wherein the pictures are carried on a long strip or "film", which is fed through the machine with an intermittent motion so as to allow each picture as it comes into register with the exposure opening of the machine, to remain stationary and be exposed for a certain period of time.

The present invention has reference particularly to the mechanism for feeding or advancing the film, and one of the objects of the invention is to improve this mechanism and render it quicker in action, whereby the necessary time consumed in shifting the film will be comparatively small in proportion to the amount of time allowed for exposing the film.

Another object is to decrease the wear on the film as much as possible.

A still further object of the invention is to accomplish the "framing" of the picture, that is, to secure proper registry of the picture with respect to the exposure opening, in a simple and practical manner, and at any time, either before, or during, the actual exhibition of the pictures.

In the art, as heretofore practiced, it has been customary to unwind the film, from the roll of film, continuously by means of a constantly rotating member, as a sprocket, to produce a slack loop. From this slack loop a length of the film is then jerked intermittently past the exposure opening of the machine. In some cases the means for jerking the film intermittently are located below the exposure opening, and in other cases both below and above the exposure opening. In both cases the tendency is to jerk the film irregularly, i. e. not in perfect alinement with the exposure opening. Attempts have been made to remedy this defect by providing an intermittent clamp for the exposed portion of the film, but as this clamp acts only when the film is standing still, the difficulty is not obviated. Sometimes a constant tension device is provided against the force of which the film is moved. This is not satisfactory, however, because the film wears out too quickly.

One object of the invention is to simplify the structure and to insure a perfectly registered movement of the film.

To this end the invention is characterized by the following features: A relatively stationary guide roll is provided on both the upper and lower side of the exposure opening, and associated with these guide rolls are reciprocating film advancing rolls which move in unison up and down. On the up stroke of the film advancing rolls, the upper roll serves to unwind a certain amount of the film directly from the roll of film. There is no constantly rotating member which feeds the film out into a slack loop, but the film is kept taut between the roll of film and the intermittently operating upper film advancing roll, and a measured or definite amount of film is thus intermittently unwound. On the up stroke of the film advancing rolls, that part of the film which is below the upper guide and advancing roll must be held so as to prevent the said upper advancing roll from pulling the film up instead of unwinding film from the film roll. In the present instance, this is accomplished by intermittently clamping that portion of the film which extends between the upper and lower advancing and guide rolls and past the exposure opening. This section of the film is herein termed "exposed portion of the film". Upon the downward stroke of the advancing rolls, the lower advancing roll jerks down an amount of film equal or substantially equal to that previously withdrawn on the up stroke by the upper advancing roll from the roll of film. Since the upper advancing roll moves down in unison with the lower advancing roll and is not unwinding film from the film roll at this time, it releases the film at the same rate of speed that the lower advancing roll takes it up, and thus the film is kept taut between the two advancing rolls and between the upper advancing roll and the roll of film. During the greater part of the down stroke the exposed portion of the film is not held, but just before the down stroke is completed, the clamp is applied on the exposed portion of the film, thereby preventing the film from being jerked too far. Below the lower guide and advancing rolls is located, in the present form, a holding device. In the present instance this consists of a sprocket which, in the embodiment shown, rotates continuously and acts as a take-up for the used portion of the film. On the up stroke of the advancing rolls, which is relatively very slow, this sprocket takes up the film as it is released by the lower advancing roll and in this manner also prevents the upper advancing roll from moving the film up instead of unwinding film from the film roll. It is preferred, however, as above described, to clamp the exposed portion of the film during this period to insure absolute accuracy. During the down stroke of the advancing rolls, which is relatively very quick, the sprocket acts to increase the tension on the film, thereby assisting the lower advancing roll in moving the film downward. By these means the film is kept under perfect control at all times, non-register with the exposure opening is avoided and the film is not subjected to any undue wear.

Other features of the invention will appear as the specification proceeds.

In the accompanying drawings there is illustrated a preferred embodiment of my invention, but it will be understood that many modifications and changes may be made therein without departing from the spirit and scope of the invention, and also while I have illustrated my invention in its adaptation to an apparatus for projecting pictures, it will be understood that the various features may be adapted for, and used as well with, the camera for taking the pictures, and the claims are to be construed accordingly.

In the accompanying drawings: Figure 1 is a rear view of the machine with certain of the working parts broken away and shown in section. Fig. 2 is a side elevation of the machine looking toward the right-hand side in Fig. 1. This view shows the parts in position at the beginning of the downward or advancing stroke of the film advancing rolls. It will be noted that the pressure of the clamp is at this time released to permit the free movement of the film. Fig. 3 is a similar view of the parts at the completion of the downward stroke of the film advancing rolls. At this time the exposed portion of the film is being held in the clamp. In this view the pressure rolls for holding the film in engagement with the film sprocket are shown in dotted lines in the "off" position to permit the engagement of the leading end of the film with the sprocket. Fig. 4 is a broken detail view of certain of the parts to illustrate the method of adjusting the lower guide roll for the purpose of framing the picture. Fig. 5 is a detached detail view of the door or gate member, taken from the rear thereof. Fig. 6 is a detached view of the film advancing cam, with the cam roll in position in the cam groove therein.

Similar reference characters refer to like parts throughout the several views.

In the present invention, the film advancing means consists preferably of a pair of rolls 1, journaled in parallelism on the ends of the rocker arms 2, which in turn are carried by the shafts 3, journaled in the frame 4 of the machine. The rolls are caused to move in unison, as by being connected together by a connecting link 5. These rolls are designed to advance the film past the window or exposure opening 7, in the plate 8, by a series of short, quick movements or jerks, and for this reason the rolls are given a reciprocating or oscillatory movement. In the present instance, an oscillatory movement is imparted to the rolls by means of the crank arm 9, on the end of one of the shafts 3, carrying a cam roll 10, in engagement with a cam groove 11, in the face of the cam member 12, which here performs the function of a balance wheel as well. The cam is of such shape as to give the film advancing rolls a quick downward stroke and a comparatively slow return stroke. This may be done by making the cam with a gradually declining curved portion 13, which imparts the comparatively slow rising movement to the advancing rolls, and the abruptly rising portion 14, which gives to the rolls their quick downward movement. Associated with the film advancing rolls, is a pair of relatively stationary guide rolls 15. For the purpose of adjusting the film, to frame the pictures with respect to the exposure opening, one of the guide rolls is preferably made adjustable with respect to the corresponding advancing roll and for this reason it may be carried by a swinging lever 16, having a worm sector 17 engaged by a worm 18. The worm may be operated by a thumb nut 19.

In connection with the film advancing rolls, I employ means for holding the film to prevent the same from being drawn backward upon the upward oscillation of the film advancing rolls. This means may consist only of a film take-up device, such as the feed sprocket 20, which is so timed as to wind up the film at the same speed as the lower film advancing roll moves during its upward stroke. But in addition to this, I prefer to employ a clamping device for positively holding that part of the film being actually exposed. This clamping device preferably consists of a door or clamping member 21 movable toward and away from the member 8, and between which two members the film is passed. The movable clamping member may be hung from a stud or support 22, so as to swing toward and away from the other member of the clamping pair. The movable clamping member is preferably provided with a pair of yielding spring shoes 23 adapted to bear on the edges of the film and the said movable member is operated to alternately clamp and release the film by any suitable means. In the present instance these means consist of a hook 24 engaging a part 25 on the lower edge of the door, the said hook being carried by a lever 26, pivoted to swing on the center 27, and carrying a cam roll 28, adapted to be engaged by the cam 29. A spring 30 acts to normally hold the door in its clamping position and for this reason it may be connected to the inner end of the hook part 24. The hook is preferably pivotally secured upon the swinging lever, as shown, so that it may be tilted downward free of the door, to permit the door to be swung upward out of its clamping position. The spring thus serves the double purpose of holding the hook in engagement with the door and in holding the door in clamping engagement with the relatively stationary clamping member. The spring may, if desired, be fixedly or adjustably anchored to the frame. Preferably, however, it is secured to an annulus 31, which is rotatably adjustable upon a projection 32, which projection may be the journal bushing for the main driving shaft 33. The tension of the spring may be adjusted by partially rotating the annulus upon its support and when so adjusted, the annulus is secured, as by means of a set screw 34. The cam for releasing the pressure of the clamping device may be carried on the opposite end of the shaft 35, which carries the other cam for actuating the advancing rolls. The clamp cam 29, has a rise of sufficient size and duration, and it is so timed that when the advancing rolls commence their downward stroke, the pressure of the clamping device is released to allow the film to move freely, but before the end of the downward stroke is reached, the pressure is reapplied to place the film under tension and prevent its being drawn down too far.

The shutter may be of any approved type, or if found to be not necessary, it may be dispensed with entirely. In the present case I have illustrated a shutter of my own invention, which is specifically claimed in a companion application filed by me. The shutter blade 35' is carried by an arm 36, pivoted at 37, and the shutter may conveniently be operated by means of a link 38, connected to the cam 29.

Any suitable gearing may be employed for giving motion to the various parts. In the present instance, a main drive gear 39 on the main shaft meshes with a somewhat smaller gear 40 on the sprocket shaft 41. Revoluble with the gear 40, is another gear 42 which meshes with a pinion 43 on the cam shaft. The machine may be operated by power or manually and in the latter case, a driving crank 44 would be engaged on the main driving shaft.

The roll of film is so supported that it may be freely withdrawn from the holder or support, and for this reason I prefer to use a form of film support, such as that disclosed in a copending application of mine, Serial No. 496,512, and which as herein shown, consists substantially of a casing 45, within which there is a rotatable film supporting member 46, adapted to rotate freely upon the center 47, as the film is unwound. The film support may be carried by the frame of the machine, or upon a member separate from the machine, such as the post 48. The used portion of the film, after passing through the machine, may be coiled again, or be disposed of as desired. I prefer to coil the used film within a film container or receiver, such as that shown in my application Serial No. 496,512, which receiver is journaled to rotate freely so as to respond to the coiling action of the film therein and the film is thus coiled in the receiver with its leading end outward, so that it may be taken from the receiver, placed in the support, and be used again without rewinding. If desired, film reels may be substituted for the film support and receiver shown, and in such event the upper reel would be freely rotatable to respond to the uncoiling action of the film, and the lower reel would be driven to wind up the film as it comes from the take-up device.

The operation of my invention is substantially as follows: The film 50 passes from the film support, down under the first or upper guide roll, up over the first, upper, film advancing roll, down through the clamping device, under the lower advancing roll, over the second guide roll, down through the take-up device, and thence to the film receiver or other member. In the first position, that shown in Fig. 1, the film advancing rolls have reached the limit of their upward stroke and have just commenced to descend. The clamp cam at this moment releases the pressure of the clamping device and that portion of film in the grip of the clamp, is left free to be moved by the advancing rolls. The used portion of the film, is held against backward movement by means of the sprocket or take-up device, so that as the advancing rolls descend, a length of film, substantially equal to the stroke of the advancing rolls is drawn downward past the exposure opening. In this downward movement, the lower advancing roll is the active one, for this is the one which actually pulls down the film. Before, however, the rolls reach the limit of their downward movement and before the downward pull on the film ceases, the clamp cam has turned to allow the clamp to again exert its pressure on the film and at or near the end of the stroke therefore the film is held under tension in the clamping device and is thereby prevented from being pulled down too far or out of register with the exposure opening. The upward stroke of the advancing rolls is more gradual and slow, and during this movement, the film is wound in by the take-up device at a rate substantially equal to the rise of the lower advancing roll, so that the film is held substantially taut, and no slack or loop is formed between the clamp and the take-up device. If there be any slight looseness in the film between the advancing rolls and take-up device, this looseness may be taken up by the constantly operated take-up device, during that very short interval of time in which the advancing rolls have reached the limit of the upward stroke and are just starting to descend. The clamp device exerts its pressure to hold the film during the upward stroke of the advancing rolls and at this time the shutter is open to expose the picture so held by the clamp. During this upward movement of the rolls, the upper roll is constantly drawing on the film in the film support. Now, when the advancing rolls descend again, they carry down with them an amount of film proportionate, and substantially equal to, that amount withdrawn from the film support. The upper roll thus acts to intermittently withdraw the film directly from the film support, and the use of a device for unwinding the film from the film support is therefore unnecessary. Furthermore, by dispensing with an unwinding sprocket or other device, I dispense with the necessity for forming a loop or slack in the film, above the advancing rolls. By the means illustrated, or equivalent means, the film is thus fed through the machine in a substantially taut condition at all times and with none of the customary film loops, heretofore considered as necessary and essential.

The framing device is very simple in its operation, and it will be obvious that by moving the adjustable guide roll one way or the other, the film may be drawn downward or released more or less, so as to frame the pictures with respect to the exposure opening, and this, regardless of whether the machine is in operation or not.

What is claimed, is:

1. Film feeding mechanism for moving picture machines, comprising a film support, a pair of film advancing rolls, means for oscillating said film advancing rolls, a pair of relatively stationary guide rolls associated with the film advancing rolls, means for adjusting one of said relatively stationary rolls to move the film and frame the pictures thereon with respect to the exposure opening of the machine, and holding means adapted to act upon the film whereby upon the upward movement of the film advancing rolls, one of said rolls will draw a predetermined length of the film from the film support, and upon the downward stroke of the film advancing rolls, the other of said rolls will pull down a length of the film substantially equal to that withdrawn during the upward stroke of the advancing rolls.

2. Film feeding mechanism for moving picture machines, comprising a support for a roll of film and from which the film may be freely withdrawn, a pair of film advancing rolls, relatively stationary guide rolls associated with the film advancing rolls, a pressure device adapted to hold the portion of the film being exposed, during exposure periods, means for moving the film advancing rolls upward while the film is held by said pressure device, whereby the said rolls will act to withdraw a certain amount of film from the film support, and means adapted to relieve the pressure of the pressure device during the first part of the downward movement of the film advancing rolls, whereby upon the downward movement of the film advancing rolls, the film will be drawn down by the film advancing rolls an amount substantially equal to the amount withdrawn from the film support.

3. Film feeding mechanism for moving picture machines, comprising a film support from which the film may be freely withdrawn, a pair of film advancing rolls, relatively stationary guide rolls associated with the film advancing rolls, a pressure device adapted to hold the portion of the film being exposed, during exposure periods, means for moving the film advancing rolls downward while the film is held by said pressure device, whereby the said rolls will act to withdraw a certain amount of film from the film support, means adapted to relieve the pressure of the pressure device, during only the first part of the downward movement of the film advancing rolls, whereby upon the downward movement of the film advancing rolls, the film will be drawn down by the film advancing rolls an amount substantially equal to the amount withdrawn from the film support, and a film take-up device adapted to hold the film during the said downward movement of the film advancing rolls.

4. In a moving picture machine, means for intermittently advancing the film past the point of exposure, a clamp adapted to engage and hold the film during periods of exposure, and operating means adapted to release the clamp from holding engagement with the film during the greater part of the movement of the film and to return the clamp to holding engagement with the film just before the movement is completed.

5. The combination in a moving picture machine, of film advancing rolls and means for oscillating the same in parallelism so as to advance the film, a pressure device, and means for actuating said pressure device to hold the film during the exposure periods thereof, to release the pressure on the film when the film is being advanced, and to reapply the pressure before the end of the advance movement of the film.

6. The combination in a moving picture machine, of a pair of film advancing rolls and means for reciprocating the same so as to impart intermittent advancing movement to the film, a pressure device and means for actuating said pressure device to hold the film during exposure periods, to release the film during the first part of the advance movement thereof and to reapply the pressure to the film during the last part of the advance movement of the film.

7. The combination in a moving picture machine, of means for intermittently advancing the film, a continuously operated take-up device, a pressure device adapted to hold the film during exposure periods, and means for actuating said pressure device to relieve the pressure during the first portion of the film movement and to reapply the pressure during the last part of the film movement.

8. In a moving picture machine, a stationary member having an exposure opening therein, a door for clamping the film against the stationary member, means for imparting intermittent movement to the film, and means for releasing the door from clamping engagement with the film during a greater portion of the movement of the film, and restoring the door to clamping engagement before the end of the film movement.

9. In a moving picture machine, film feeding mechanism comprising a pair of movable rolls connected in parallelism and a pair of relatively stationary guide rolls, means for oscillating the movable rolls, and means for adjusting one of the relatively stationary guide rolls with respect to the corresponding one of the movable rolls, for framing the pictures on the film with respect to the exposure opening of the machine.

10. In a moving picture machine, film feeding mechanism comprising a pair of movable rolls connected in parallelism and a pair of relatively stationary guide rolls, means for oscillating the movable rolls, a continuously operated take-up roll, and means for adjusting one of the relatively stationary guide rolls with respect to the corresponding movable roll, for framing the pictures on the film with respect to the exposure opening of the machine.

11. In a moving picture machine, movable film advancing rolls connected to move in parallelism, a balance wheel, said balance wheel having a cam groove in the face thereof, and connection between the film advancing rolls and the said cam groove, whereby as the balance wheel is rotated, the film advancing rolls are oscillated.

12. In a moving picture machine, a supporting shaft having crank arms on the opposite ends thereof, a film advancing roll carried by one of said crank arms, a cam roll carried by the other of said crank arms, and a cam adapted to be engaged by said cam roll and to thereby impart oscillation to the film advancing roll.

13. In a moving picture machine, a plate having an exposure opening therein, a holding member movable toward and away from said plate, means for intermittently advancing the film, and means for actuating the movable holding member to release the pressure on the film during the first part of the movement thereof and to re-apply said pressure to the film before such movement ceases.

14. In a moving picture machine, a plate having an exposure opening therein, a clamping member movable toward and away from said plate, a pivoted lever, a hook carried by said lever adapted to engage the clamping member, a spring acting on said hook to hold the clamping member in clamping engagement with the plate aforesaid, and a cam adapted for engagement with a part on the pivoted lever to shift said lever outward to release the pressure of the clamping member.

15. In a moving picture machine, a plate having an exposure opening therein, means for intermittently advancing the film past the exposure opening, a clamping member movable toward and away from the said plate, a pivoted lever, a hook carried by said lever adapted to engage the clamping member, a spring acting on said hook to hold the clamping member in clamping engagement with the plate aforesaid, and a cam adapted for engagement with a part on the pivoted lever to shift said lever outward to release the pressure of the clamping member, said cam being of a shape and duration to release the pressure on the film during the first part of the intermittent advancing movement of the film and to reapply said pressure before such advancement ceases.

16. In a moving picture machine, a pair of film advancing rolls connected to move in parallelism, means for oscillating the film advancing rolls, a relatively stationary guide roll associated with one of said film advancing rolls, an adjustable arm and means for adjusting the same, and a guide roll carried by said arm adapted for coöperation with the other of the film advancing rolls.

17. In combination, a film feeding sprocket, a pair of film advancing rolls, means for oscillating said film advancing rolls in parallelism, a guide roll associated with one of the film advancing rolls, means for adjusting said guide roll with respect to the film advancing roll, a relatively stationary guide roll associated with the other film advancing roll, and means for imparting motion to the different parts.

18. In a moving picture machine, a pair of film advancing rolls connected to move in parallelism, means for imparting an up and down vibration to the said rolls, a film clamping device, means for holding said device in clamping engagement with the film during the upward movement of the film advancing rolls, and means for releasing the pressure exerted by the film clamping device during the first part of the downward oscillatory movement of the film advancing rolls and to reapply such pressure before the end of the downward oscillatory movement.

19. In a moving picture machine, a movable film advancing roll, means for oscillating said roll to advance the film, an adjustable arm and means for adjusting the same, and a guide roll carried by said arm adapted for coöperation with the movable film advancing roll.

20. In a moving picture machine, a pair of film advancing rolls, means for oscillating said rolls, a guide roll associated with one of the film advancing rolls, means for adjusting said guide roll with respect to the film advancing roll, a relatively stationary guide roll associated with the other film advancing roll, and means for imparting motion to the various parts.

21. In a moving picture machine, means for imparting an intermittent advancing movement to the film, a clamp for holding the film during exposure periods, and actuating means for said clamp adapted to release the pressure of the clamp on the film during the first part of the intermittent film movements and to reapply such pressure before the end of such film movements so as to allow the film to move freely during the first part of each movement and to hold the film under tension during the latter part of each film movement.

Signed at New York, in the county of New York and State of New York this 16th day of December A. D. 1909.

GEORGE W. BINGHAM.

Witnesses:
AXEL V. BEEKEN,
PHILIP S. McLEAN.